Sept. 25, 1962

R. A. HARRIS 3,056,050

SWITCHING SYSTEM

Filed Dec. 30, 1959

2 Sheets-Sheet 1

SAMPLING STAGE 9

INVENTOR
RICHARD A. HARRIS

BY R. P. Miller

ATTORNEY

Sept. 25, 1962

R. A. HARRIS

SWITCHING SYSTEM 3,056,050

Filed Dec. 30, 1959

2 Sheets-Sheet 2

INVENTOR
RICHARD A. HARRIS

BY R. P. Miller

ATTORNEY 3,056,050
SWITCHING SYSTEM

Richard A. Harris, High Point, N.C., assignor to Western Electric Company, Incorporated, New York, N.Y., a corporation of New York Filed Dec. 30, 1959, Ser. No. 862,840
5 Claims. (Cl. 307—115)

Figure 1:
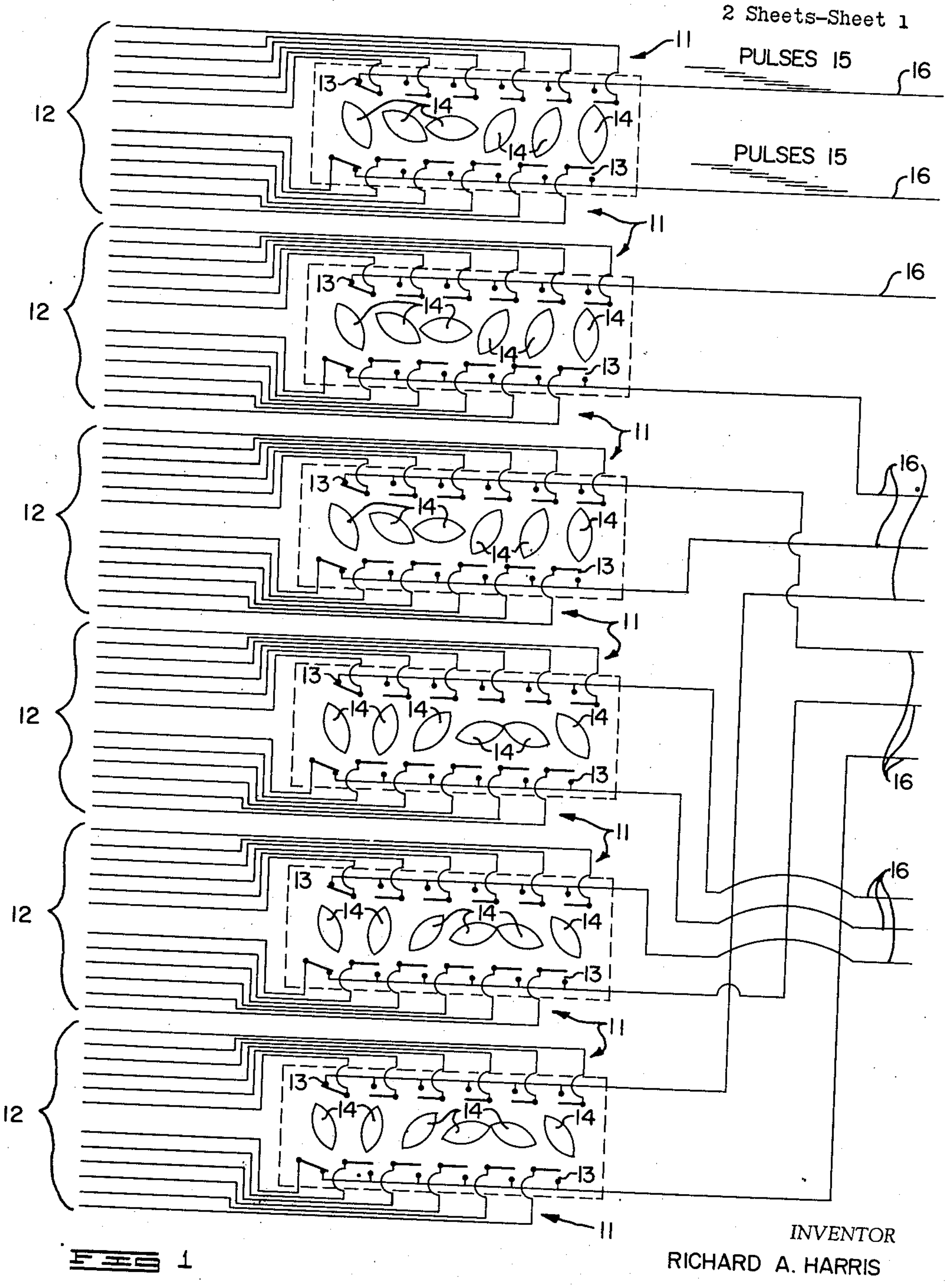
Figure 1A:
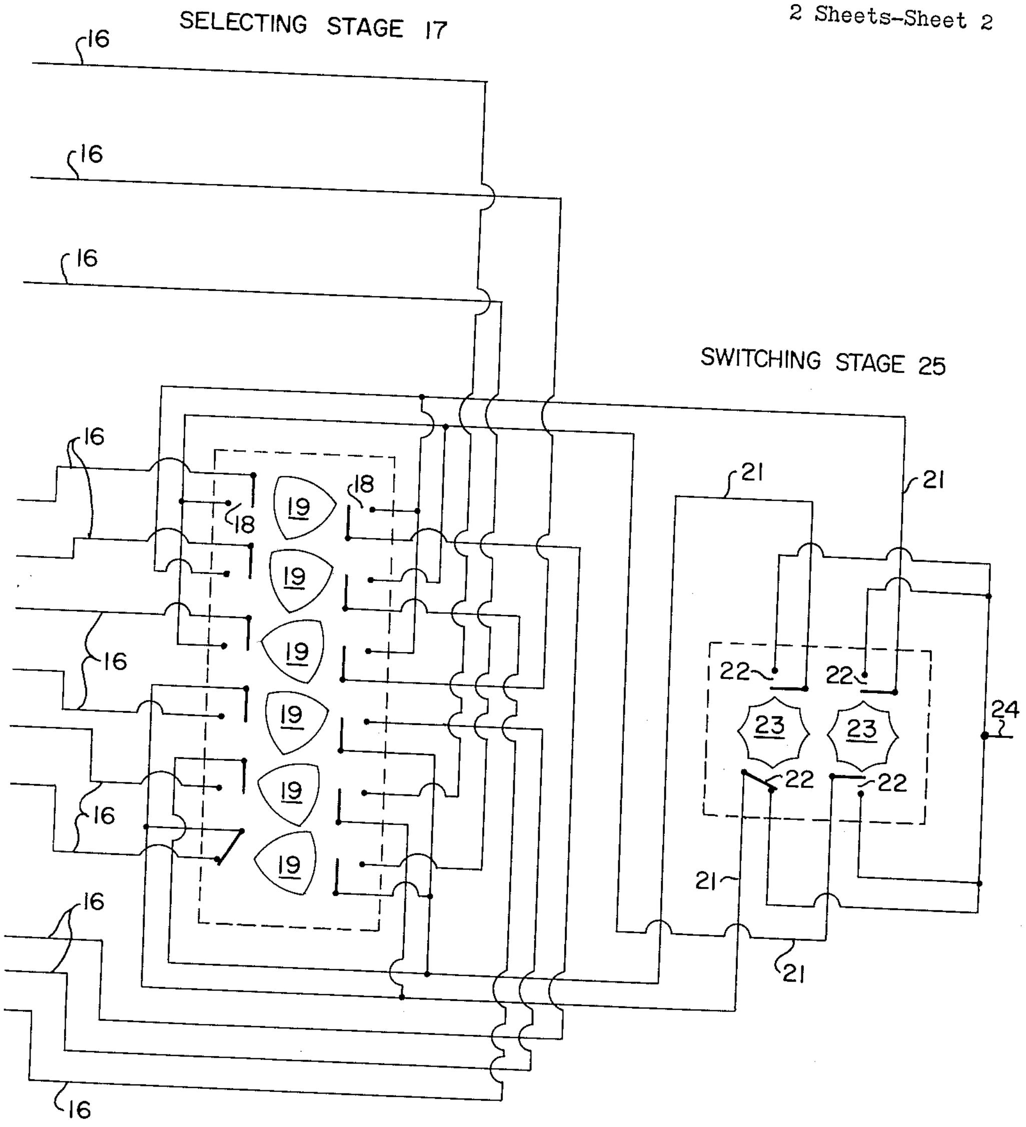

This invention relates to a switching system and more particularly to a switching system having a plurality of cam-operated gates actuated to connect sequentially signals from a plurality of input channels to an output trunk.

The present invention is intended particularly for use in electrical systems wherein high-speed switching is a basic requirement, as, for example, in the art of telemetry and modern communication systems where the mechanical commutator is impractical from manufacturing, longevity, and accuracy standpoints.

An object of the present invention is the provision of a new and improved switching system.

Another object is to provide a switching system for sampling pulses from a plurality of signals and repeating the pulses at a rate at which the signals are recreated in an output trunk with fidelity in sequence with one another suitable for viewing on an oscilloscope.

A further object of the present invention is to provide a switching system for time-sharing a plurality of input signals occurring in input information channels to an output trunk connected to each of the channels whereby a minimum of make-and-break contacts are required.

A switching system illustrating certain features of the invention may include a plurality of input channels connected to share output trunks fewer in number than the input channels. Cam-operated gates are provided for connecting each channel to a common output trunk in timed relationship with the others, whereby a signal appearing in any one channel is sampled repetitiously in sequence with signals of other input channels and fed to a common output trunk in such sequence at a predetermined rate.

A complete understanding of the invention may be had from the following detailed description of a specific embodiment thereof when read in conjunction with the appended drawing wherein is shown a wiring schematic with cams positioned to actuate gates arranged therein.

*Sampling Stage*

A sampling stage 9 is shown in the drawing to include twelve groups 11 of six channels 12 each. The groups 11 are segregated further in pairs with corresponding gates 13, such as normally open, spring-biased make-and-break contacts, separated by two-lobe cams 14 driven by suitable gearing, not shown, linked to a drive motor, for example. A gate 13 is placed in each channel 12 and is actuated in a predetermined sequence such that at any one moment pulses 15, representative of signals in the information channels, are selected to appear in each of twelve pulse-collecting leads 16 wired in common to the twelve groups 11 of six channels 12, respectively.

*Selecting Stage*

A selecting stage 17 is connected to receive the pulses 15 emanating from the twelve collecting leads 16 from the sampling stage 9. A gate 18, such as a make-and-break static switch, is disposed in each collecting lead 16 and the gates are arranged in pairs between which are positioned three-lobe cams 19.

*Switching Stage*

From the selecting stage 17 four trunks 21 are connected to the twelve collecting leads 16, one trunk being designated for each of three leads. The four trunks each include a contactor 22, such as a spring-biased static switch, which is normally open. A pair of nine-lobe cams 23 are situated to actuate the contactors 22 disposed diametrically with respect to each cam 23. The contactors 22 close to connect trunks 21 to a single output lead 24.

*Cam and Gearing Arrangement*

At the sampling stage 9 thirty-six, 180° dwell, two-lobe cams 14 are mounted in sets of six on six shafts, not shown, at 30° lobe intervals with respect to one another. Three sets of six cams 14 are 15° out-of-phase with the remaining sets such that in 180° rotation of all cams 14, seventy-two gates 13 of the input channels 12 are closed and opened. A dwell time of 25° in the instant modification enables synchronization of the operation of the cams 14 with the cams 19 of the selecting stage 17.

In relation to the cams 14 of the sampling stage, 120° dwell, three-lobe cams 19 of the selecting stage 17 are driven at a 4 to 1 speed ratio. Two sets of three, three-lobe cams 19 are fixed to a shaft, not shown, at 40° lobe intervals with respect to each other. One set is 60° out-of-phase with the other such that the twelve gates 18 in the twelve collecting leads 16 are actuated in 720° rotation of the cams 19 to select seventy-two pulses from the collecting leads 16 and connect the selected pulses to the four trunks 21 in a predetermined sequence. A dwell time of 30° of the cams 19 permits selection of pulse potentials at the selecting stage 17.

The three-lobe cams 19 of the selecting stage 17 are driven at a ratio of one-to-one with relation to the two, nine-lobe cams 23 of the switching stage 25. The latter cams are 40° dwell, with one cam 20° out-of-phase with the other about a common drive shaft, for example, not shown. The pulse current connected through trunks 21 from the selecting stage 17 to the switch contactors 22 is switched to the single output lead 24.

In this embodiment all gears and cams are driven by one motor, since the dwell time of cam-to-contact engagement at each stage of the switch is sufficient to permit ease of synchronization between the stages. True switching of current occurs only at the switching stage 25, the other two stages 17 and 9 merely are selecting potentials. The possibility of burnout of contacts is thereby eliminated except at the switching stage 25.

*Wiring Connections*

Each two-lobe cam 14 of the sampling stage 9 actuates a pair of gates 13. Two channels 12, each from a different group 11 of six channels 12, are connected to two side-by-side gates 13. The gates 13 of three groups 11 are actuated simultaneously, but alternately with respect to the gates 13 of the remaining three groups 11 of cams 14, since the cams 14 of three groups are affixed to their shafts 15° out-of-phase with respect to the cams 14 of the other three groups 11. As the cams 14 rotate, six gates 13 are closed approximately simultaneously, and within further rotation of 15°, six more gates 13 close simultaneously such that in 180° of rotation of the cams 14 all seventy-two gates 13 are closed and opened by cam contact. The twelve collecting leads 16 each receive one of the pulses from the closing of twelve gates 13 in the manner described hereinabove at any one instant.

Six pulses 15 from each of the twelve groups of channels occur in each collecting lead 16 as overlapping train pulses in 180° of rotation of the cams 14. These pulses are reduced one third in time duration by the three-lobe cams 19 of the selecting stage 17 where six pairs of gates 18 are disposed for actuation by the six cams 19. The gates 18 are wired to the four trunks 21 in groups of three for time sharing, and these trunks 21 are in turn switched to one output lead 24 where the pulses are sent on for system use.

*Operation*

When a system requirement is to repeat incoming signals in the seventy-two channels 12, 600 times per minute in sequence for display on an oscilloscope, for example, the two-lobe cams 14 of the sampling stage 9 are driven at 300 r.p.m. Each incoming signal is then sampled ten times per second, the seventy-two channel samplings amounting to 720 signals per second, or 43,200 signals per minute.

In 180° of rotation of the two-lobe cams 14 at the sampling stage 9, seventy-two gates 13 are closed and reopened. During this period, the three-lobe cams 19 of the selecting stage 17 rotate 720°, or two cycles at 1200 r.p.m., to select repeatedly a one-third central portion of each of the overlapping seventy-two sample pulses 15 from the sampling stage 9, and pass them through trunks 21 as distinct pulses to the switching stage 25 for further connection to the output lead 24.

At the switching stage 25 the seventy-two distinct pulses appearing at a rate of ten times per second are time-shared by the two cams 23 to effect an output of 43,200 signal pulses per minute to the output lead 24. The output of 43,200 pulses per minute appears in a sequence of serial pulses from the seventy-two input channels 12 at a repetition rate of 600 times per minute.

It is obvious that the above-described embodiment of the invention is merely illustrative and that numerous modifications may be made within the spirit and scope of the invention.

What is claimed is:

1. A switching system comprising a plurality of input circuits arranged in groups, a collecting lead connected to each group of circuits, gating means in each circuit for connecting the input circuits to the collecting leads, means for operating the gating means in a predetermined sequence and rate of speed, a plurality of trunks each connected to a number of collecting leads, gating means in each collecting lead for connecting the leads to the trunks, means for operating the latter gating means in a predetermined sequence and rate of speed, an output lead connected to the trunks, switch means in each trunk for connecting the trunks to the output lead, and means for operating the switch means in a predetermined sequence and rate of speed for time-sharing the output lead whereby signals appearing in the input circuits are connected to the output lead seriately at a predetermined rate of repetition.

2. A switching system comprising a plurality of input circuits arranged in groups, a collecting lead connected to each group of circuits, a cam operable normally open switch in each circuit for connecting the input circuits to the collecting leads, cam means for operating the switches in a predetermined sequence and rate of speed, a plurality of trunks each connected to a number of the collecting leads, a cam operable normally open switch in each collecting lead, cam means for operating the switches in the collecting leads in a predetermined sequence and rate of speed, an output lead connected to the plurality of trunks, a cam operable normally open switch in each trunk, and cam means for operating the trunk switches in a predetermined sequence and rate of speed whereby signals occurring in the input circuits appear as pulses in the output lead serially and at a predetermined rate of repetition.

3. A switching system which comprises a sampling stage including a plurality of input circuits arranged in groups, a collecting lead connected to each of the groups, gating means in the circuits, means for operating the gating means for connecting the input circuits to the collecting leads in a predetermined sequence and rate of speed; a selecting stage including a plurality of trunks connected one to a number of collecting leads, gating means in each collecting lead for connecting the collector leads to the trunks, means for operating the collecting-lead gating means in a predetermined sequence and rate of speed; and a switching stage including an output lead connected to the plurality of trunks, gating means in each trunk, means for operating the gating means for connecting the trunks to the output lead in sequence at a predetermined rate of speed whereby signals carried in the trunks are time-shared to the output lead.

4. A switching system comprising a plurality of input circuits arranged in groups, a collecting lead connected to each group, gating means in each circuit for connecting the input circuits sequentially to the collecting leads, a first cam shaft, a plurality of two-lobe cams mounted on the shaft for rotation with a cam positioned between pairs of gating means for operating the gating means sequentially, gating means in each collecting lead, a second cam shaft, a plurality of three-lobe cams mounted on the second shaft for rotation, the three-lobe cams being interposed between pairs of gating means in the collecting leads, drive means connected to the first cam shaft and the second cam shaft for rotating the second cam shaft at a related speed to the first cam shaft such that from each signal carried in the leads a preferred pulse is selected, and an output lead connected to the collecting leads for receiving the selected pulses from the leads through timed operation of the gating means in both the input circuits and the collecting leads.

5. A switching system comprising a plurality of input circuits arranged in pairs of groups for carrying input signals, a pair of pulse collecting circuits for each pair of input circuit groups, means for sequentially connecting the input circuits of each group to the respective pulse collecting circuits to produce in each pulse collecting circuit a series of overlapping pulses, trunk means fewer in number than the pulse collecting circuits for receiving portions of each series of overlapping pulses, means for sequentially connecting predetermined pulse collecting circuits to the respective trunk means to apply portions of each series of overlapping pulses appearing in the pulse collecting circuits to said trunk means, an output circuit for conducting a series of pulses, and means for sequentially connecting the trunk means to the output circuit to seriately apply portions of the overlapping pulses appearing in said trunk means to said output circuit.

References Cited in the file of this patent

UNITED STATES PATENTS 2,832,071 Hendricks ---------------- Apr. 2, 1958